(No Model.) 2 Sheets—Sheet 1.
W. P. CANNING.
ELECTRIC STOP MOTION FOR MACHINES FOR PREPARING SLIVER.
No. 551,920. Patented Dec. 24, 1895.
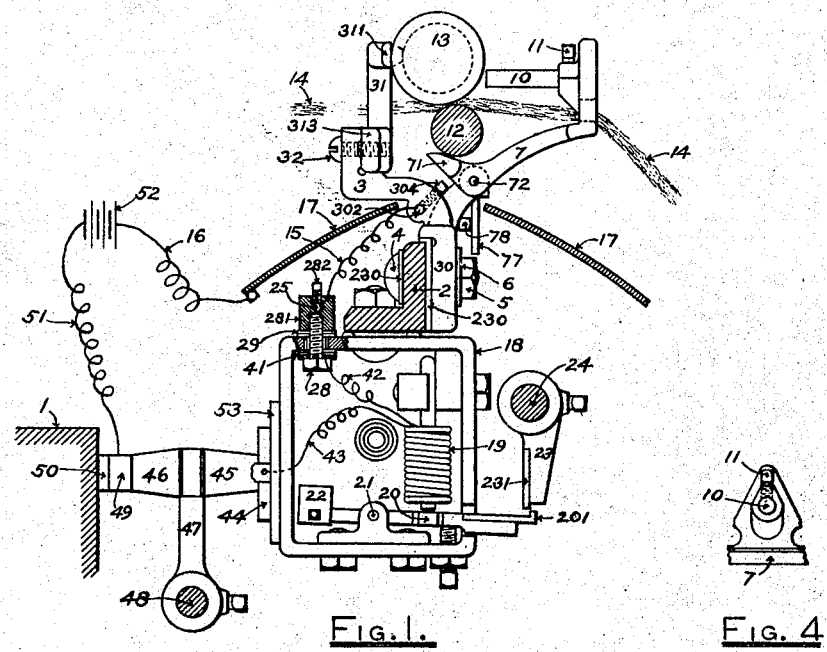
Fig. 1. Fig. 4.
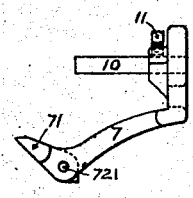
Fig. 3.
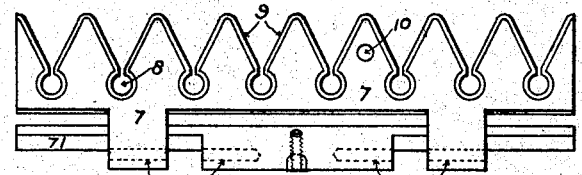
Fig. 2.
Fig. 13.
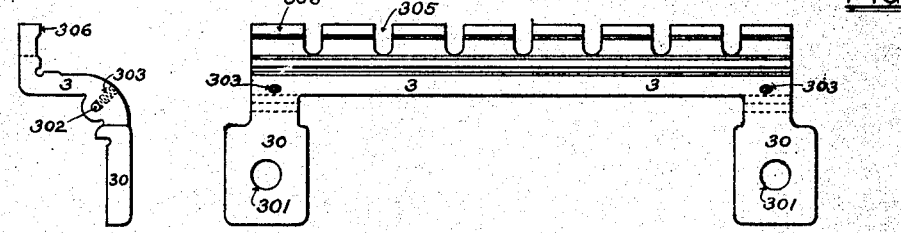
Fig. 6. Fig. 5.
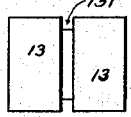
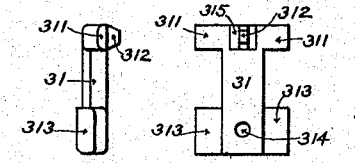
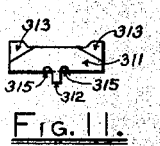
Fig. 8. Fig. 7. Fig. 10. Fig. 9. Fig. 11.
WITNESSES.
Channing Whitaker.
Saml. G. Stephens.
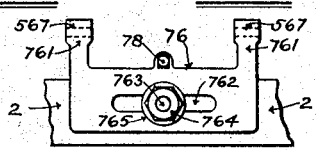
Fig. 12.
INVENTOR.
William P. Canning.

(No Model.) 2 Sheets—Sheet 2.
W. P. CANNING.
ELECTRIC STOP MOTION FOR MACHINES FOR PREPARING SLIVER.
No. 551,920. Patented Dec. 24, 1895.
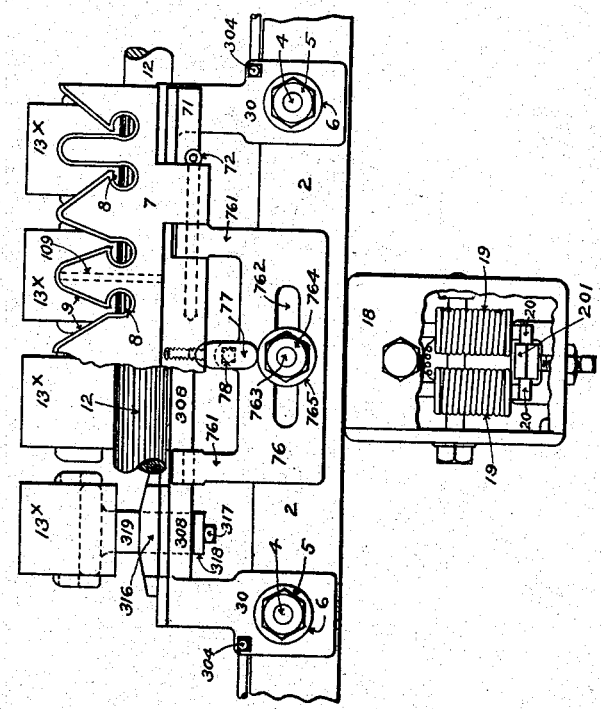
WITNESSES.
Channing Whitaker
Saml. G. Stephens
INVENTOR.
William P. Canning

UNITED STATES PATENT OFFICE.

WILLIAM P. CANNING, OF LOWELL, MASSACHUSETTS, ASSIGNOR TO THE LOWELL MACHINE SHOP, OF SAME PLACE.

ELECTRIC STOP-MOTION FOR MACHINES FOR PREPARING SLIVER.

SPECIFICATION forming part of Letters Patent No. 551,920, dated December 24, 1895.

Application filed June 19, 1895. Serial No. 553,257. (No model.)

*To all whom it may concern:*

Be it known that I, WILLIAM PITT CANNING, a citizen of the United States, residing at Lowell, in the county of Middlesex and Commonwealth of Massachusetts, have invented certain new and useful Improvements in Electric Stop-Motions for Machines for Preparing Sliver, of which the following is a specification, reference being had therein to the accompanying drawings.

My invention consists in an electric stop-motion mechanism of novel and improved construction and arrangement, which is adapted to act whenever a sliver becomes exhausted or discontinued, or whenever a lap forms upon the so-called "electric" roll, or whenever a knot or entanglement in the sliver presents itself which will not become straightened out on its arrival at the sliver-guide.

The invention resides, more particularly, in certain features of novel construction and combination, all as hereinafter is explained fully with reference to the accompanying drawings, and as afterward is more particularly pointed out and distinctly defined in the claims at the close of this specification.

In the drawings, Figure 1, Sheet 1, is a view, partly in vertical section but mainly in side elevation, showing an electric stop-motion having my invention embodied therein in the best form thereof which I have yet contrived, only such parts of the usual construction being shown as are required in order to afford an understanding of the nature and working of the invention. Fig. 2, Sheet 1, is a view in rear elevation showing the sliver guide or rail. Fig. 3, Sheet 1, is a view in side elevation of the same. Fig. 4, Sheet 1, is a detail view of a portion thereof, showing the projecting rod which engages with one of the presser-rolls. Fig. 5, Sheet 1, is a view in rear elevation of the stand to support the retaining-standards of the presser-rolls. Fig. 6, Sheet 1, is a view in side elevation of the same. Figs. 7 and 8, Sheet 1, are views in rear elevation and side elevation, respectively, of one of the presser-rolls. Figs. 9, 10, and 11, Sheet 1, are views in rear elevation, side elevation, and plan, respectively, of one of the retaining-standards of the presser-rolls. Fig. 12, Sheet 1, is a view in rear elevation of the support on which the sliver guide or rail is mounted pivotally and a portion of the rail to which the said support is attached. Fig. 13, Sheet 1, is a detail view showing the stop-finger which is carried by the swinging sliver guide or rail. Fig. 14, Sheet 2, is a view similar in character to Fig 1, showing a modification. Fig. 15, Sheet 2, is a view of the parts and construction which are shown in Fig. 14, looking at them from the right-hand side in the latter figure, with a small part of the casing of the electromagnet broken away.

At 1, Fig. 1, is a part of the fixed framework of a machine for preparing slivers. At 2 is a cross-rail attached to such framework.

At 12 is a rotating roll, which is termed usually the "electric" roll, and at 13 is one of the presser-rolls which rest on said electric roll 12. A series of presser-rolls is shown in Fig. 15, Sheet 2.

At 14, Fig. 1, is shown a sliver.

As customary, the rolls 12 and 13 are in electrical communication, respectively, with opposite terminals from a source of electrical energy. Normally a break in the circuit is occasioned by the separation of the roll 13 from the roll 12 by the material passing between them, so that no metallic contact occurs. When, however, the said material becomes discontinued, the roll 13 is permitted to touch the roll 12, whereupon the circuit is completed, the electromagnet is energized and the shipping mechanism is brought into action to stop the machine. In part the electrical connections extending to the rolls 12 and 13 are through the metallic portions of the machine, proper care being taken to insulate those parts which pertain to one branch of the circuit from those pertaining to the other branch thereof.

The first portion of my invention has reference to the manner of supporting the presser-rolls in position, and I now will proceed to describe the same.

At 3, Figs. 1, 5, and 6, is a stand which is applied to the cross-rail 2 and is secured thereto by bolts 4, one of which is shown in Fig. 1, the said bolts passing through holes 301 301 in lugs 30 30, Fig. 5, which are formed on the opposite ends of the stand 3, and also through similar holes in rail 2. A nut 5 and washer 6, Fig. 1, are applied to the threaded end of each of the bolts 4. Sheets of insulating material 230 230, Fig. 1, are placed on the opposite sides of rail 2, between the said sides and the proximate surfaces of the lugs 30 30, and of the heads of the bolts 4, to insulate the said bolts 4 and stand from rail 2.

31, Fig. 1, is one of a series of standards which are secured to the stand 3, there being such a standard provided in connection with each presser-roll. Each presser-roll rests upon the electric roll 12 and lies in the space or angle between the latter roll and the corresponding standard 31, the said standard having lateral wings 311 311, Figs. 9, 10, and 11, against which the surface of the presser-roll bears and by which the axis of the presser-roll is held parallel with that of roll 12. The said wings contact with the said surface at opposite sides of the circumferential groove 131, which is formed in roll 13, the said groove being occupied by a projection 312 on the standard, which projection holds the presser-roll from longitudinal displacement. The standards 31 are widened at their lower ends by forming them with wings 313 313, Figs. 9 and 10, which give extended surfaces for contact with the surface 306 on the stand 3 to which they are applied, thereby securing greater stiffness and steadiness, each standard being secured to the stand by a bolt or screw 32, the threaded end of which enters a threaded hole 314 in the standard. The bolts or screws 32 pass through open-ended vertical slots 305 in the stand 3, (see Fig. 5,) thus providing for the ready application and removal of the standards, and also for the vertical adjustment thereof to bring their upper ends into contact with the surfaces of the presser-rolls 13 at the desired height.

The second portion of my invention has reference to effecting a stoppage of the machine when a roll-up or lap occurs on the electric roll 12, and also when a knot or entanglement in one of the slivers presents itself, and I will now proceed to describe the same.

At 7, Figs. 1, 2, and 3, Sheet 1, is a sliver guide or rail. It is formed with openings 8 therethrough for the passage of the slivers and is mounted pivotally upon the stand 76, which latter is secured to the rail 2 by a bolt 763, (see Fig. 12, Sheet 1,) the said bolt having applied to the threaded end thereof the nut 764 and washer 765. The said sliver-guide is pivoted upon pins 72, Fig. 1, which pass into holes 721 in the sliver-guide, and also pass through holes 567, which are made through the upwardly-extending lugs 761 761, Fig. 12, on the stand 76. To permit the sliver-guide to be adjusted endwise to the extent which may be required in order to locate the sliver-passages in proper position relatively to the presser-rolls 13, the stand 76 is formed with a longitudinal slot at 762 for the reception of the bolt 763, which secures it to rail 2. Through its supporting devices the sliver-guide 7 is embraced in the electric circuit on the same side of the break therein as the electric roll 12. The sliver-guide 7 is formed or furnished with a wing or extension 71, (see Figs. 1, 2, and 3,) which extends beneath the electric roll 12 and into close proximity thereto. Should a roll-up or lap of one or more slivers occur on the said electric roll 12, the accumulation of material will bear against the said wing or extension 71 and will operate to turn the sliver-guide 7 upon its pivots, thereby effecting contact at the other side of the break in the electric circuit. Preferably I cause the contact to be made with one of the rolls 13. To this end one extremity of a rod or pin 10 is fitted into a socket in the sliver-guide and secured therein by a clamping-screw 11, (see Figs. 1, 2, and 4,) its free end projecting into proximity to the desired one of said rolls 13.

At 77 is a stop-finger, which is shown separately in Fig. 13, Sheet 1. It is applied to the sliver-guide 7 and is arranged to coact with a stop 78, constituted by the head of a screw, so as thereby to determine the normal position of the sliver-guide 7, these devices serving to hold wing 71 just out of contact with the electric roll 12 in order to avoid the wear which would result from contact of the said wing with the moving surface of the said roll.

The weight of the sliver-guide 7 is chiefly at the right of the pivots 72 in Fig. 1, so that the body of the sliver-guide and pin or rod 10 carried thereby naturally gravitate away from the rolls 12 and 13 until arrested by the stop devices 77 and 78. The openings 8 through the sliver-guide are large enough to permit free passage of slivers in their normal condition, but should knots or entanglements occur in the slivers and not straighten out on or before arriving at the sliver-guide such knots or entanglements will be detained by the sliver-guide and the continued strain on the slivers will operate to cause the sliver-guide to swing forwardly on its pivots until the pin or rod 10 is carried into contact with the adjacent presser-roll 13, whereupon the machine will be arrested.

The electrical devices which coact with the foregoing to effect the stopping of the machine are or may be of any suitable and approved character and construction. I will now proceed to describe those which I have shown in the accompanying drawings.

At 18 is a case or frame which is bolted to rail 2. 19 is an electromagnet within the said case or frame. 20 is a lever-armature coacting with the said electromagnet. 21 is the pivot of the said lever-armature. 22 is a counterbalancing-weight applied to one end of said lever-armature, and 201 is a detent formed on the other end of said lever-armature. 23 is a vibrating arm or striker carrying a plate 231 to engage with the said detent 201 when the electromagnet has operated to raise the detent into the path of movement of the lower part of the said plate, the said striker being mounted upon a striker-shaft 24, which in practice is vibrated or oscillated by known means, the latter being of usual character and operating, on the occasion of the movement of the striker being arrested by engagement of plate 231 with detent 201, to effect the release of the shipper, whereby to occasion the stoppage of the machine. One wire 42 leads from the electromagnet 19 to a binder-screw 28, the stem of which passes through the shell of frame or case 18, it being insulated therefrom by the washers 41 and 29 of insulating material, said stem entering a metal block 281 having a binder-screw 282, which secures one end of a wire 15, the latter having its opposite end applied to a hole 302 in stand 30, where it is secured by screw 304, fitted to a threaded hole 303 in the said stand. A second wire 43 extends from the electromagnet to a contact-plate 44, said contact-plate being separated from the exterior of the case or frame 18 by insulating material 53. A second contact-plate 49 is secured to frame 1, it being separated therefrom by insulating material 50. The contact-plates 49 and 44 are electrically connected by means of contact-springs 45 and 46, which are mounted upon the arm 47, carried by the shipper-rod 48. While the machine is running, the contact-springs 45 and 46 engage with the contact-plates 44 and 49; but when the shipper-rod 48 is moved to stop the machine the said contact-springs are moved, thereby breaking the circuit between the contact-plates 44 and 49.

At 52, Fig. 1, is indicated, conventionally, a battery, and 51 16 are wires leading therefrom to the contact-plate 49 and one of the covers 17, respectively.

The modification which is represented in Figs. 14 and 15 differs from what has been described chiefly in that the rod or pin 10 on the sliver-guide is replaced by a lug or pin 109, which is integral with the said sliver-guide, and also in having a different means of supporting the presser-rolls 13× in position. In these figures each of the presser-rolls has journals 133 at its opposite ends, which are received in notches 132, provided in the arms of stands 319. The said stands have arms which project into the spaces between the adjacent ends of the said presser-rolls.

I deem the construction which is shown on Sheet 1 better than that shown in Figs. 14 and 15, inasmuch as in the former the rolls have no journals and there are no arms projecting into the spaces between the adjacent ends of the presser-rolls. Thus the said construction has nothing to catch and retain fibers at the ends of the rolls, and in placing a sliver under one of the presser-rolls it may be passed down at the end of such roll and carried laterally under the same without it being necessary to remove such presser-roll from the machine. This feature of the invention is especially advantageous in cases where there are many large cans at the back of the machine. Former constructions of electric stop-motions render it needful for the operative to displace such cans in order to reach the presser-roll and to remove it in piecing up.

The stand 319, (shown in Fig. 14,) has a foot or base which rests upon a rail 308, carried by a stand 309, which latter is insulated from rail 2 and bolted to the same. Lugs 316 318 extend down from said foot or base on opposite sides of rail 308, and a clamping-screw 317 passes upwardly in an inclined direction through lug 318, it taking bearing by its end against the under side of rail 308 and serving to secure the stand 319 to the said rail.

I claim as my invention—

1. The combination with shipping devices, including an electro-magnet, a roll 12, a presser-roll 13 normally insulated from roll 12 by the material passing between them, and electrical connections constituting with the foregoing parts an electric circuit which normally is broken between roll 12 and presser-roll 13, of the movable sliver-guide constructed to be borne against by a lap formed upon roll 12 and to close the break in the circuit when moved by a lap on said roll, substantially as described.

2. The combination with shipping devices, including an electro-magnet, a roll 12, a presser-roll 13 normally insulated from roll 12 by the material passing between them, and electrical connections constituting with the foregoing parts an electric circuit which normally is broken between roll 12 and presser-roll 13, of the movable sliver-guide constructed to be borne against by a lap formed upon roll 12 and having a part which comes into contact with presser-roll 13 when the said sliver-guide is moved by a lap, to thereby close the break in the circuit, substantially as described.

3. The combination with shipping devices including an electro-magnet, a roll 12, a presser-roll 13 normally insulated from roll 12 by the material passing between them, and electrical connections constituting with the foregoing parts an electric circuit which normally is broken between roll 12 and presser-roll 13, of the movable sliver-guide also embraced in the said circuit, constructed to be borne against by a lap formed upon roll 12, and also to arrest knots and entanglements in the slivers, and to close the break in the circuit when moved by a lap on said roll, substantially as described.

4. The combination with shipping devices including an electro-magnet, a roll 12, a presser-roll 13 normally insulated from roll 12 by the material passing between them, and electrical connections constituting with the foregoing parts an electric circuit which normally is broken between roll 12 and presser-roll 13, of the movable sliver-guide also embraced in the said circuit, constructed to be borne against by a lap formed upon roll 12, and also to arrest knots and entanglements in the slivers, and having a part which comes into contact with presser-roll 13 when the said sliver-guide is swung toward the latter, substantially as described.

5. The combination with the rolls 12 and 13, of the sliver-guide 7, the stand 76 on which the said sliver-guide is mounted pivotally, a support for the said stand, and means for effecting adjustment of the said stand and the sliver-guide mounted thereon longitudinally of the said rolls, substantially as described.

6. The combination with the roll 12, of the presser-rolls 13 each of the latter having the circumferential groove 131, standards 31, each thereof having a projection which enters the groove of one of the said rolls to restrain the latter from endwise movement, the said rolls resting in the space between roll 12 and the said standards, a supporting stand for the said standards, and means to adjust the said standards vertically on the said supporting stand, substantially as described.

In testimony whereof I affix my signature in the presence of two witnesses.

WILLIAM P. CANNING.

Witnesses:
SAML. G. STEPHENS,
MARY CAVERLY.